US00RE40974E

(19) United States
(12) Reissued Patent
Tsai et al.

(10) Patent Number: US RE40,974 E
(45) Date of Reissued Patent: Nov. 17, 2009

(54) APPARATUS FOR SCANNING DOCUMENTS IN FRONT OF A DOCUMENT PLATE

(76) Inventors: Jenn-Tsair Tsai, No. 6, Alley 7, Lane 298, Sec. 2, Guangfu Rd., Hsinchu City 300 (TW); Albert Lu, No. 15, Alley 9, Lane 288, Syuefu E. Rd, Jhudong Township, Hsinchu County 310 (TW); Emmet Chen, No.2, Alley 19, Lane 550, Nan-Da Road, Hsin-Chu (TW)

(21) Appl. No.: 11/405,040

(22) Filed: Apr. 13, 2006

Related U.S. Patent Documents

Reissue of:
(64) Patent No.: 6,721,072
Issued: Apr. 13, 2004
Appl. No.: 09/661,469
Filed: Sep. 13, 2000

(51) Int. Cl.
*H04N 1/40* (2006.01)

(52) U.S. Cl. ..... 358/471; 358/497; 358/494; 358/474; 358/487; 399/211; 355/66; 355/67

(58) Field of Classification Search ..... 358/474, 358/494, 497, 471, 487, 475, 509; 359/897; 399/211; 355/66, 67
See application file for complete search history.

(56) References Cited

U.S. PATENT DOCUMENTS

| | | | | | |
|---|---|---|---|---|---|
| 4,486,786 | A | * | 12/1984 | Sato et al. | 358/497 |
| 4,989,099 | A | * | 1/1991 | Koshiyouji et al. | 358/474 |
| 5,243,381 | A | * | 9/1993 | Hube | 399/84 |
| 5,251,072 | A | * | 10/1993 | Fukuoka et al. | 359/896 |
| 5,761,394 | A | * | 6/1998 | Sugiura et al. | 358/1.9 |
| 5,814,809 | A | * | 9/1998 | Han | 250/208.1 |
| 5,907,413 | A | * | 5/1999 | Han | 358/497 |
| 5,966,221 | A | * | 10/1999 | Tellam et al. | 358/475 |
| 6,101,003 | A | * | 8/2000 | Wu et al. | 358/474 |
| 6,233,065 | B1 | * | 5/2001 | Lee | 358/475 |
| 6,304,358 | B1 | * | 10/2001 | Lin et al. | 359/196.1 |

* cited by examiner

*Primary Examiner*—Negussie Worku
(74) *Attorney, Agent, or Firm*—Perkins Coie LLP

(57) ABSTRACT

The present invention provides a scanning device. The scanning device comprises a document plate for placing a document, at least a sliding guide placed at one side of the document plate, a scanning module which is in front of the document plate for scanning the document along the direction of the sliding guide, a first light source assembled in the scanning module for providing light to scan documents, and a driving module electrically connected to the scanning module for driving the scanning module to perform scanning procedure to the document.

37 Claims, 3 Drawing Sheets

APPARATUS FOR SCANNING DOCUMENTS IN FRONT OF A DOCUMENT PLATE

Matter enclosed in heavy brackets [ ] appears in the original patent but forms no part of this reissue specification; matter printed in italics indicates the additions made by reissue.

*CROSS-REFERENCE TO RELATED APPLICATION*

*More than one reissue application has been filed for reissue of U.S. Pat. No. 6,721,072. The reissue applications are the present application, filed on Apr. 13, 2006, and U.S. patent application Ser. No. 11/468,772 (now abandoned), filed on Aug. 31, 2006.*

BACKGROUND OF THE INVENTION

1. Field of the Invention

The present invention generally relates to a scanning device. Specifically, an apparatus for scanning a document in front of a document plate.

1. Background Description

Please refer to FIG. 1. There are shown a traditional flatbed scanner 10 and a monitor 12. The scanner comprises a frame 14, a transparent document glass 16 for placing a document 18, a cover 19 for positioning on the document 18, and a scanning module 20 which is assembled inside the frame 14. The scanning module 20 is movable back and forth in order to scan the document 18 on the transparent document glass 16. The scanner 10 is connected to the monitor 12. Before the formal scanning processes are conducted, the scanning module 20 will perform a preview scan in order to determine the position of the document 18. When the formal scanning processes are conducted, there is a performance bar 24 on the display 22 of the monitor, for showing the position of the scanning module 20 and indicating the relative position compared to the frame 14.

During scanning the document, although the performance bar 24 can indicate the position of scanning module 20. However, the performance bar 24 is unable to precisely indicate the position of the scanning module 20 because it takes time to process mass digital signals. If the user eager to know the precise position of the scanning module 20, the user must open the cover 19 to observe the status of the scanner 10. In this regard, it is inconvenient. Moreover, this kind of action of a user would interfere in the scanning processes.

Further, since the flatbed scanner requires a lot of area to be placed, it is therefore not efficient to use the flatbed scanner in a restricted office environment.

SUMMARY OF THE INVENTION

It is therefore an object of the present invention to provide a scanning device for scanning a document in front of a document plate, rather than scanning the document via a transparent document glass.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
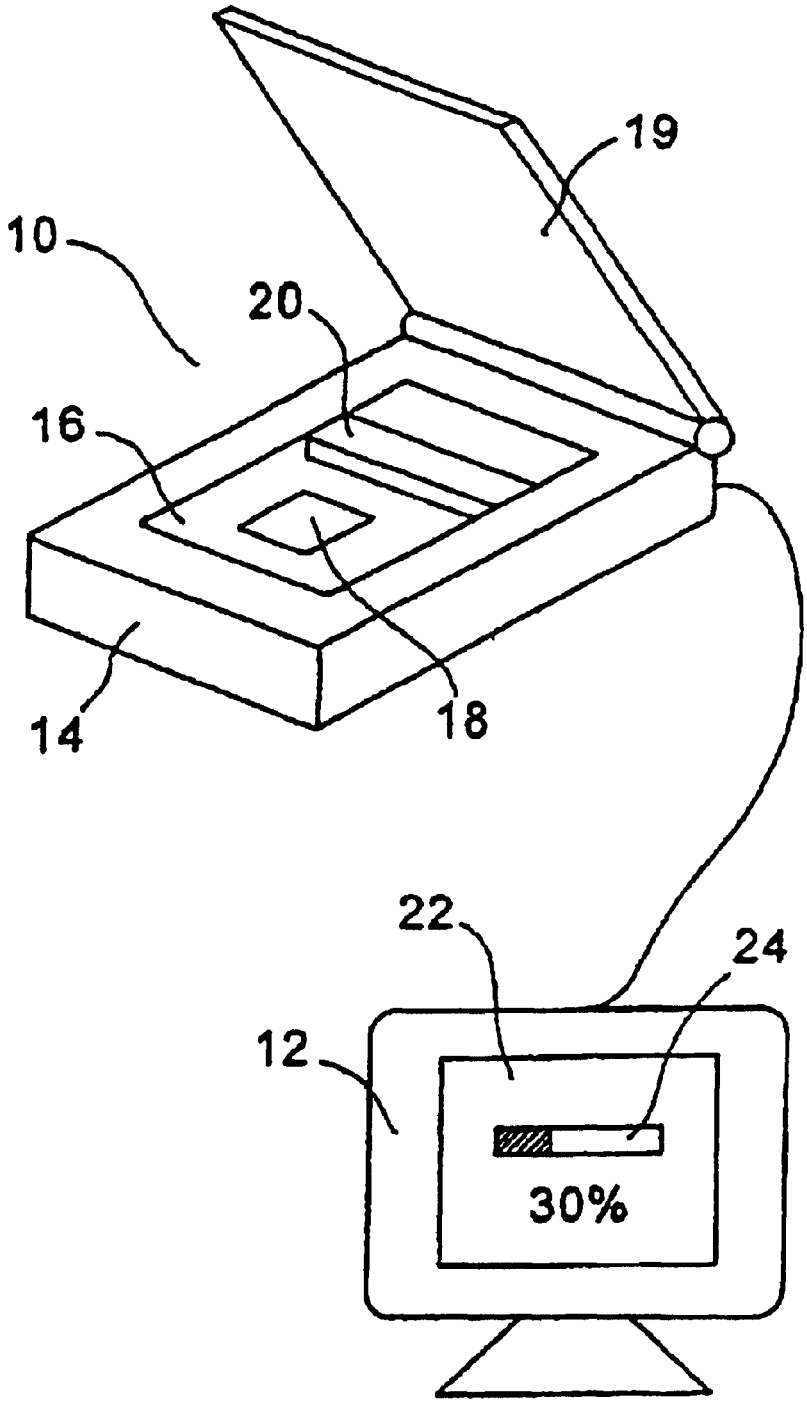
Figure 1 (PRIOR ART)
FIG. 1 is a schematic demonstration of a traditional scanner and a monitor.
Figure 2:
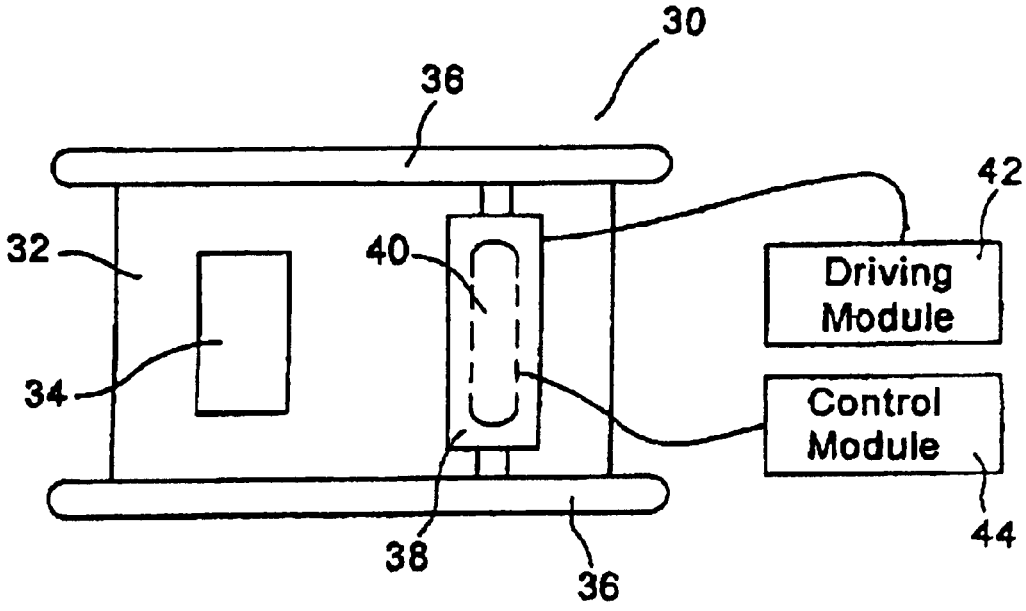
FIG. 2 is a schematic demonstration of the present invention.
Figure 3:
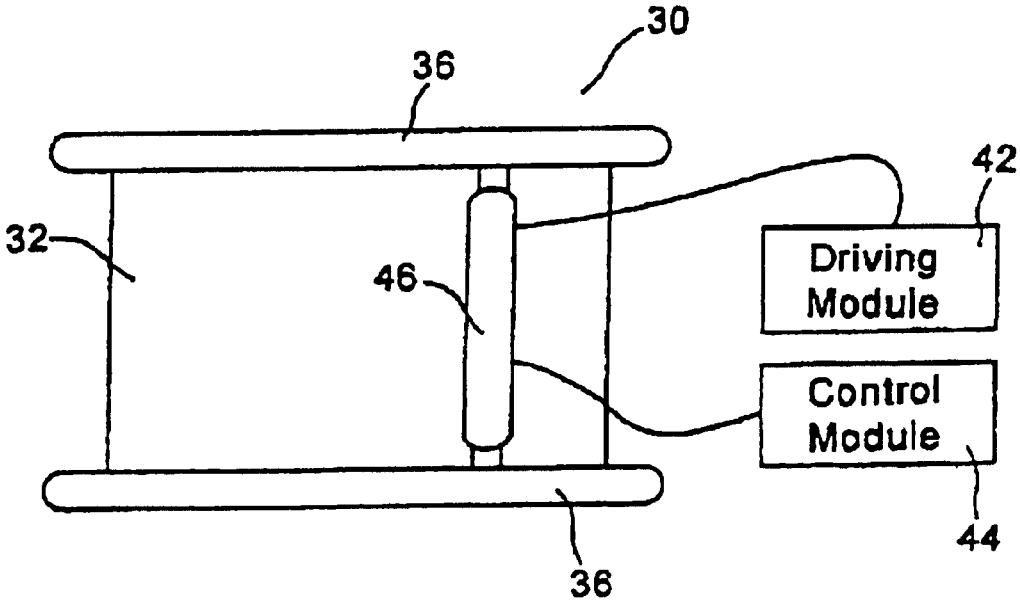
FIG. 3 is a rear view of the present invention.

Please refer to FIGS. 2 and 3. FIG. 2 shows the scanning device 30. FIG. 3 shows the rear view of the scanning device 30. The scanning device 20 is able to stand on the table or to be placed flat on the table. The scanning device 30 comprises a document plate which can be a transparent plate 32, two sliding guides 36 and a scanning module 38, wherein the scanning module 38 is placed in front of the transparent plate 32. The two sliding guides 36 are adjacent to the transparent plate 32 in each side in parallel. The scanning module 38 is a contact image sensor (CIS). The scanning device 30 further comprises a first light source 40 which is assembled inside the scanning module 38 to provide light for scanning reflective documents, a second light source 46 placed in the rear side of the transparent plate 32 to provide light for scanning transparent documents, a driving module 42 electrically connected to the scanning module 38 for driving the scanning module 38 to scan the document 34 placed on the transparent plate 32, and a control module 44 for coordinating the on/off of the first light source 40 and the second light source 40 with other modules. Both sides of the scanning module 38 are positioned on the sliding guides 36 in order to let the scanning module be movable to scan the document 34 placed on the transparent plate 32, along the parallel direction of the sliding guides.

In FIGS. 2 and 3, the sliding guides are placed on the upper and bottom side of the transparent plate 32. However, the sliding guides are also able to be placed on the left and right sides of the transparent plate 32. In this case, the scanning module is therefore movable along the upper and bottom side of the transparent plate 32, to scan the document 34 placed on the transparent plate 32. Furthermore, the sliding guides would be reduced to only one existed. The sliding guide will be parallel to the surface of the transparent plate 32. Therefore, the scanning module 38 scans the document placed on the transparent plate 32, along the parallel direction to the sliding guide.

Specifically, during scanning a reflective document, the control module 44 will turn on the first light source 40 which is at the same side of the document and turn off the second light source 46 which is at the opposite side of the document, for providing necessary illumination to perform the reflective-type scanning procedure. On the other hand, during scanning a transparent document, the control module 44 will turn on the second light source 46 and turn off the first light source 46, for providing necessary illumination to perform the transparent-type scanning procedure. The second light source 46 would be a light tube or a light plate. If the second light source 46 is a light tube, the light tube will be connected to the driving module 42 electrically. The driving module 42 will synchronize the movement of the light tube with the scanning module 38 to scan the transparent document. If the second light source 46 is light plate, the light plate would follow the instructions of the control module 44 to be turned on or off.

Figure 4:
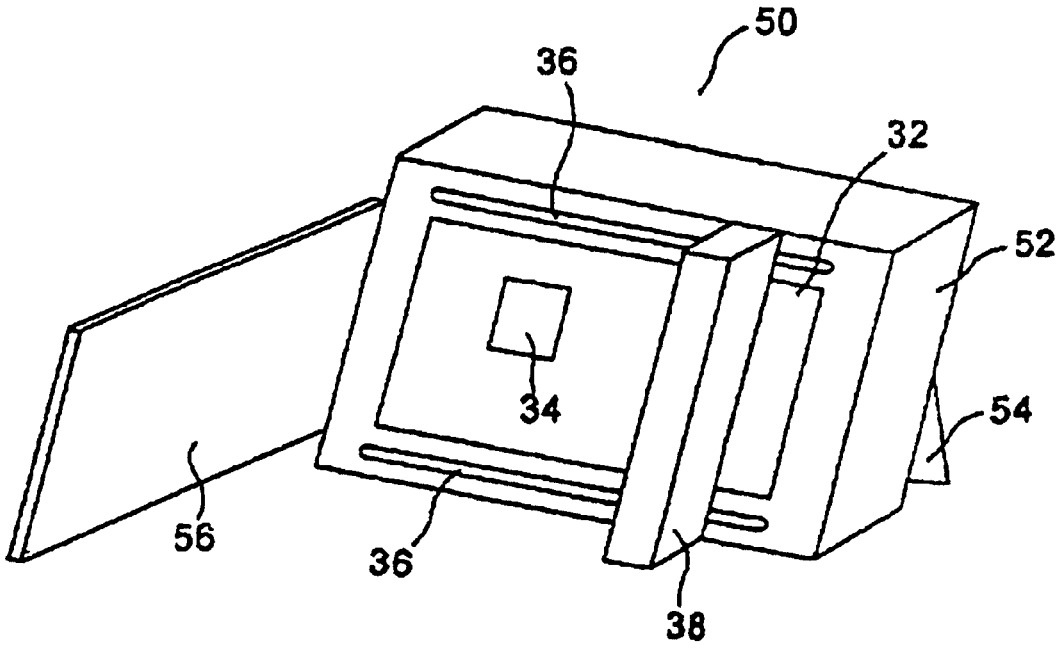
FIG. 4 is a schematic demonstration of another embodiment of the present invention.

FIG. 4 shows another embodiment of the present invention. The difference between the scanning device 50 and the scanning device 30 is that the scanning device 50 comprises a frame 52 and a stand 54 which are mounted on the back side of the frame 52. The stand 54 is able to support the frame 52 in a declined position. In the scanning device 50, the transparent plate 32 is on the front side of the frame 52. The two sliding guides 36 are parallel to each other and be placed on both sides of the front of the frame 52. The scanning module 38 is placed in front of the transparent plate 32. Both sides of the scanning module 38 are placed on the sliding guides in order to scan the document in the direction parallel to the sliding guides. The stand 54 is able to be placed into the frame 52 elastically. Therefore, the scanning device can be placed on the desk as a flatbed scanner.

The scanning devices 30 and 50 further comprise a transparent cover 56 for holding the document 34 on the transparent plate 32. Beside employing the transparent cover 56 for holding the document 34. A transparent membrane or by static electric effect is able to be employed for holding the document 34 on the transparent plate 32, in order too preventing the document dropping out of the transparent plate. Moreover, the user can directly draw or write on the transparent plate by removable ink. Thus, the scanning module 38 is able to scan the written script and/or drawings.

Comparing to the traditional scanning device 10, the scanning module 38 of the scanning device 38 is in the front of the transparent plate 32. Particularly, the scanning module 38 and the document 34 are in the side of the transparent plate 32. In this case, a user can directly observe the position and status of the scanning module 38. Further, the scanning device 30 can stand on a table or any place in the office. The scanning device 50 is able to stand on a place by a declined degree for saving the necessary space for placement of a scanner. Moreover, the user can directly scan the written scripts and drawings on the transparent plate or the transparent cover along with the document. When the scanning device of the present invention is off the work, some beautiful or meaningful pictures can be placed on the transparent plate for decoration purposes.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. A scanning device comprising:

a housing;

a document plate within the upper surface of said housing for placing a document;

a first sliding guide outside of said housing mounted on said document plate;

a scanning module outside of said housing, wherein one side of said scanning module is connected to said first sliding guide to be movable along the direction of said first sliding guide;

a first light source assembled inside said scanning module for providing scan illumination; and a driving module[,] electrically connected to said scanning module for driving said scanning module to scan said document.

2. The scanning device of claim 1, wherein said document plate is a transparent plate.

3. The scanning device of claim 2, further comprising:

*a second light source; and* a control module for coordinating on and off of said first light source and said second light source;

wherein said first light source turned on and said second light source turned off is for scanning a reflective document, and said first light source turned off and said second light source turned on is for scanning a transparent document.

4. The scanning device of claim 3, wherein said second light source is a light tube, which is electrically connected to said driving module, *and* said driving module synchronizes the movement of said scanning module and said light tube for scanning said transparent document.

5. The scanning device of claim 3, wherein said second light source is a light panel for providing light to scan said transparent document.

6. The scanning device of claim 1, further comprising a stand, pivoted on a bottom surface of said housing for supporting said housing in a declined position.

7. The scanning device of claim 1, further comprising a transparent cover for holding said document on said document plate.

8. The scanning device of claim 1, wherein said document is held on said document plate by static electric effect.

9. The scanning device of claim 1, further comprising a transparent membrane for holding said document on said document plate.

10. The scanning device of claim 1, wherein said scanning module is a contact image sensor.

11. The scanning device of claim 1, further comprising a second sliding guide parallel to said first sliding guide, wherein said scanning module is able to move along the direction of the sliding guides.

*12. A scanning device, comprising:*

*a document plate at a surface of a housing, capable of receiving a document;*

*a guide outside said housing; and*

*a scanning module outside of said housing and operably coupled to said guide, wherein the scanning module is movable generally along the direction of said guide.*

*13. The scanning device according to claim 12, further comprising a driving module operably coupled to said scanning module and capable of driving said scanning module to scan the document.*

*14. The scanning device according to claim 12, wherein said document plate comprises a transparent plate.*

*15. The scanning device according to claim 12, wherein the document plate has a first surface and a second surface, and wherein the scanning device further comprises:*

*a first light source carried by said scanning module, wherein said scanning module is proximate to the first surface; and*

*a second light source proximate to the second surface.*

*16. The scanning device according to claim 15, further comprising a control module capable of activating and/or deactivating said first light source and said second light source.*

*17. The scanning device according to claim 15, wherein said first light source is activated and said second light source is deactivated during a scan of a reflective document.*

*18. The scanning device according to claim 15, wherein said first light source is deactivated and said second light source is activated during a scan of a transparent document.*

*19. The scanning device according to claim 15, further comprising a driving module operably coupled to said scan-*

*ning module, and wherein said second light source includes a light tube operably coupled to said driving module, said driving module being capable of synchronizing the movement of the second light source with said scanning module for scanning a document.*

*20. The scanning device according to claim 15, wherein said second light source comprises a light panel.*

*21. The scanning device according to claim 12, further comprising a stand, capable of being pivotally connected to a surface of said housing, and capable of providing support for said housing in a generally declined position.*

*22. The scanning device according to claim 12, further comprising a transparent cover capable of securing the document adjacent said document plate.*

*23. The scanning device according to claim 12, wherein said scanning module comprises a contact image sensor.*

*24. The scanning device according to claim 12, further comprising another guide generally parallel to said guide, and wherein said scanning module is capable of moving generally in the direction of said guide and/or said another guide.*

*25. A method, comprising:*

*receiving a document at a document plate at a surface of a housing; and*

*scanning said received document, wherein said scanning comprises moving a scanning module generally along a guide, said guide being external to said housing.*

*26. The method according to claim 25, wherein said scanning further comprises activating and/or deactivating a first light source and a second light source.*

*27. The method according to claim 26, wherein said scanning further comprises activating said first light source and deactivating said second light source during a scan of a reflective document.*

*28. The method according to claim 26, wherein said scanning further comprises deactivating said first light source and activating said second light source during a scan of a transparent document.*

*29. The method according to claim 26, further comprising synchronizing the movement of said scanning module and a driving module with the activation and/or deactivation of said first light source and said second light source, if scanning a document.*

*30. The method according to claim 25, further comprising securing said received document to said document plate.*

*31. The method according to claim 25, wherein said scanning further comprises moving said scanning module generally in a direction of said guide and/or another guide.*

*32. The method according to claim 25, wherein said scanning further comprises driving said scanning module by a driving module, if scanning a document.*

*33. An apparatus, comprising:*

*means for receiving a document at a housing;*

*means for moving a scanning module generally along a guide, said guide being outside of said housing; and*

*means for scanning said received document.*

*34. The apparatus according to claim 33, wherein said means for scanning further comprises means for activating and/or deactivating a first light source and a second light source.*

*35. The apparatus according to claim 34, further comprising means for synchronizing the movement of said scanning module with said means for activating and/or deactivating said first light source and said second light source, if scanning a document.*

*36. The apparatus according to claim 33, further comprising means for securing said received document to said housing.*

*37. The apparatus according to claim 33, wherein said means for moving a scanning module further comprises means for moving said scanning module generally in a direction of said guide and/or another guide.*

* * * * *